(12) United States Patent
Chiang et al.

(10) Patent No.: US 6,957,856 B2
(45) Date of Patent: Oct. 25, 2005

(54) BICYCLE SEAT POST

(75) Inventors: Douglas Chiang, Dali (TW); David Michael Anthony, Dali (TW)

(73) Assignee: Tien Hsin Industries Co., LTD, Tali (TW)

( * ) Notice: Subject to any disclaimer, the term of this patent is extended or adjusted under 35 U.S.C. 154(b) by 130 days.

(21) Appl. No.: 10/854,204

(22) Filed: May 27, 2004

(65) Prior Publication Data

US 2005/0012365 A1    Jan. 20, 2005

Related U.S. Application Data

(62) Division of application No. 10/618,967, filed on Jul. 14, 2003.

(51) Int. Cl.[7] .................................................. B62J 1/00
(52) U.S. Cl. ............................. 297/195.1; 297/215.13; 403/292; 403/309; 403/371
(58) Field of Search ...................... 297/215.13, 215.14, 297/215.15, 195.1; 403/300, 309, 310, 292, 403/297, 365, 367, 371; 280/281.1, 288.4; 29/897.2, 897.33

(56) References Cited

U.S. PATENT DOCUMENTS

| | | | | |
|---|---|---|---|---|
| 674,752 A | * | 5/1901 | Baker | 403/292 |
| 2,420,715 A | * | 5/1947 | Millward | 29/897.33 |
| 4,789,176 A | * | 12/1988 | Carroll | 297/215.13 |
| 4,900,049 A | * | 2/1990 | Tseng | 280/281.1 |
| 6,499,800 B2 | * | 12/2002 | Morgan, Jr. | 297/195.1 |

FOREIGN PATENT DOCUMENTS

FR    2550153 A1  *  2/1985    .......... B62K 19/36

* cited by examiner

*Primary Examiner*—Anthony D. Barfield

(57) ABSTRACT

A bicycle seat post includes two arcuate plates and a reinforcement board sandwiched between the two arcuate plates. Each arcuate plate has two lengthwise end surfaces and each end surface includes an inner corner edge and an elongate surface defined in an outer corner edge thereof. The two lengthwise end surfaces contact two opposite sides of the reinforcement board. Each of lengthwise top surface and lengthwise bottom surface of the reinforcement board is connected between the two respective elongate surfaces of the two arcuate plates so as to form two longitudinal grooves in an outer surface of the seat post.

1 Claim, 3 Drawing Sheets

BICYCLE SEAT POST

FIELD OF THE INVENTION

This application is a divisional application of applicant's former application with application Ser. No. 10/618,967, filed on Jul. 14, 2003.

BACKGROUND OF THE INVENTION

A conventional bicycle seat post is generally made as a cylindrical metal tube and the saddle is connected to an end of the seat post. The seat post is inserted in the seat tube of bicycle frame and a clamping device clamps the open end of the seat tube of the bicycle frame so as to position the seat post in the seat tube of the bicycle frame. The saddle supports the weight of the rider so that the clamping device has to securely tighten the open end of the seat tube so as to keep the seat post from sliding in the seat tube. The stress of concentration is located at the portion of the seat post contacting the open end of the seat tube. The seat post in the seat tube is stiff and does not have any flexibility to absorb the inward clamping force applied by the clamping device such that the seat post could be damaged or cracked by the force.

The present invention intends to provide a seat post that includes two arcuate plates and a reinforcement rib which is sandwiched between the two arcuate plates so as to obtain better strength.

SUMMARY OF THE INVENTION

In accordance with one aspect of the present invention, there is provided a bicycle seat post which comprises two arcuate plates and each arcuate plate has two lengthwise end surfaces. Each end surface has an inner corner edge and an elongate surface is defined in an outer corner edge thereof. A reinforcement board is sandwiched between the two arcuate plates and the two lengthwise end surfaces contact two opposite sides of the reinforcement board. Each of lengthwise top surface and lengthwise bottom surface of the reinforcement board is connected between the two respective elongate surfaces of the two arcuate plates so as to form two longitudinal grooves in an outer surface of the seat post.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figures 1, 2:
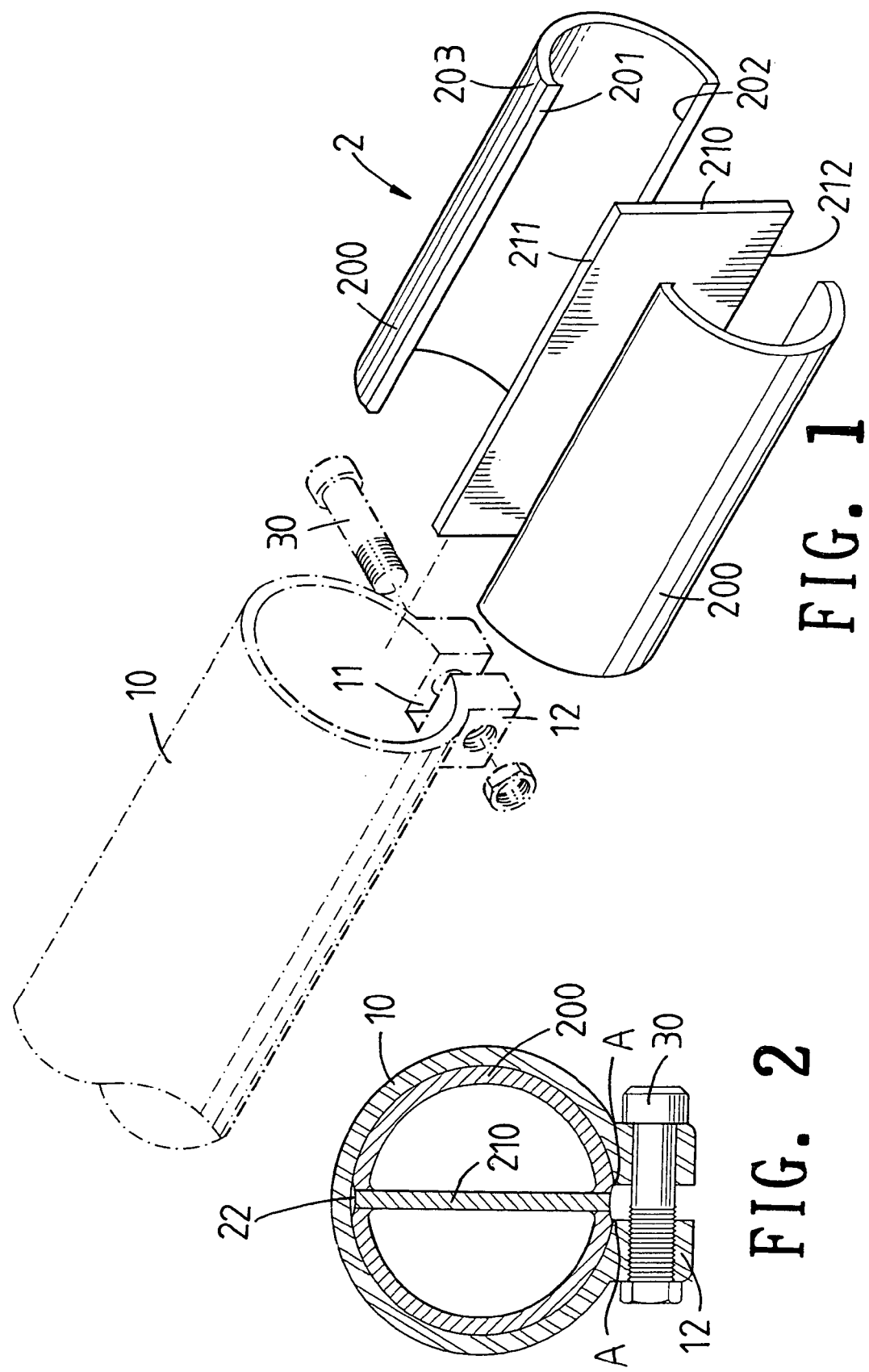
FIG. 1 is an exploded view to show a seat tube of bicycle frame and the seat post of the present invention.
FIG. 2 is a cross sectional view to show that the seat post is received in the seat tube.
Figure 3:
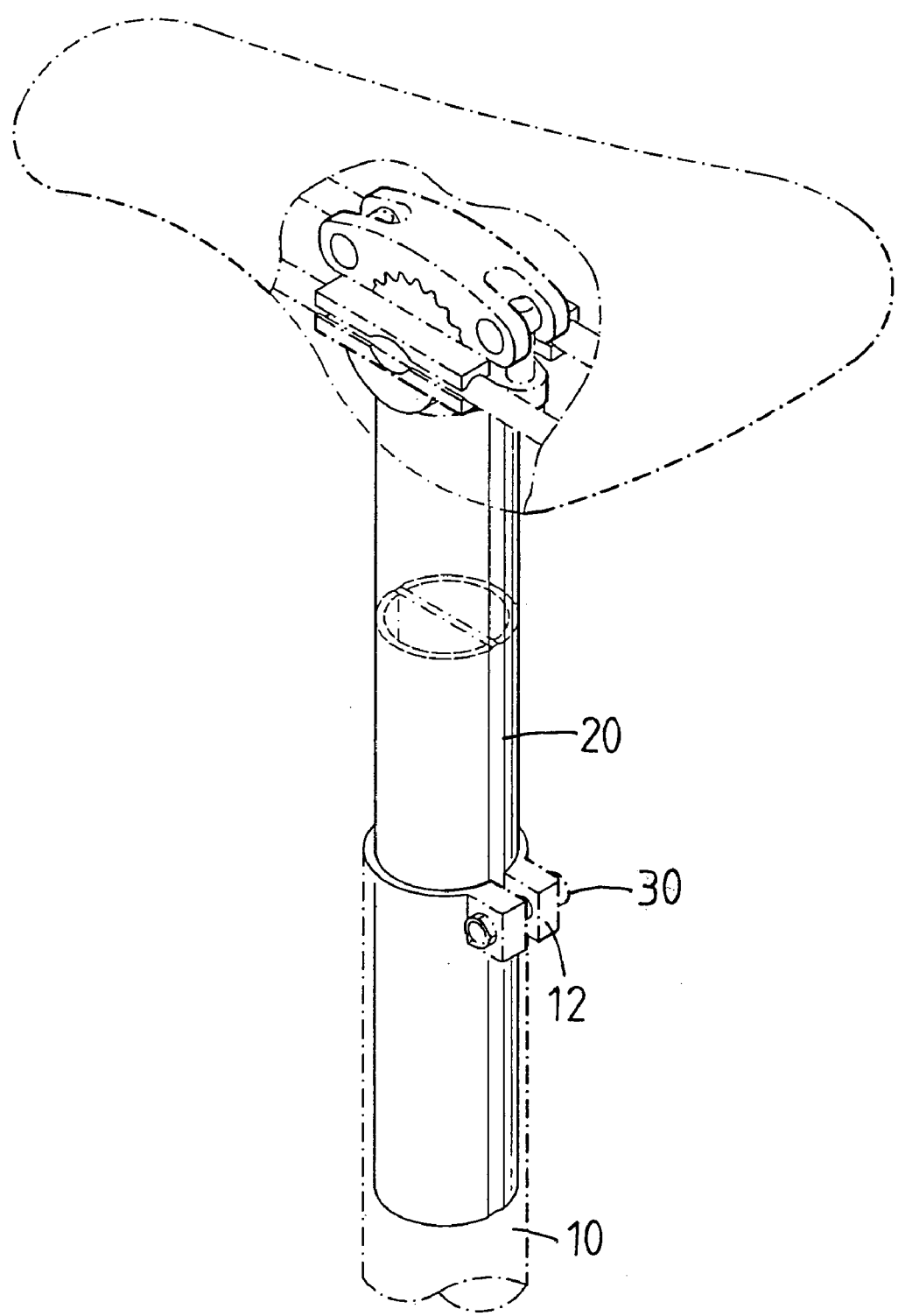
FIG. 3 shows a seat is connected to the seat post received in the seat tube.
Figure 4:
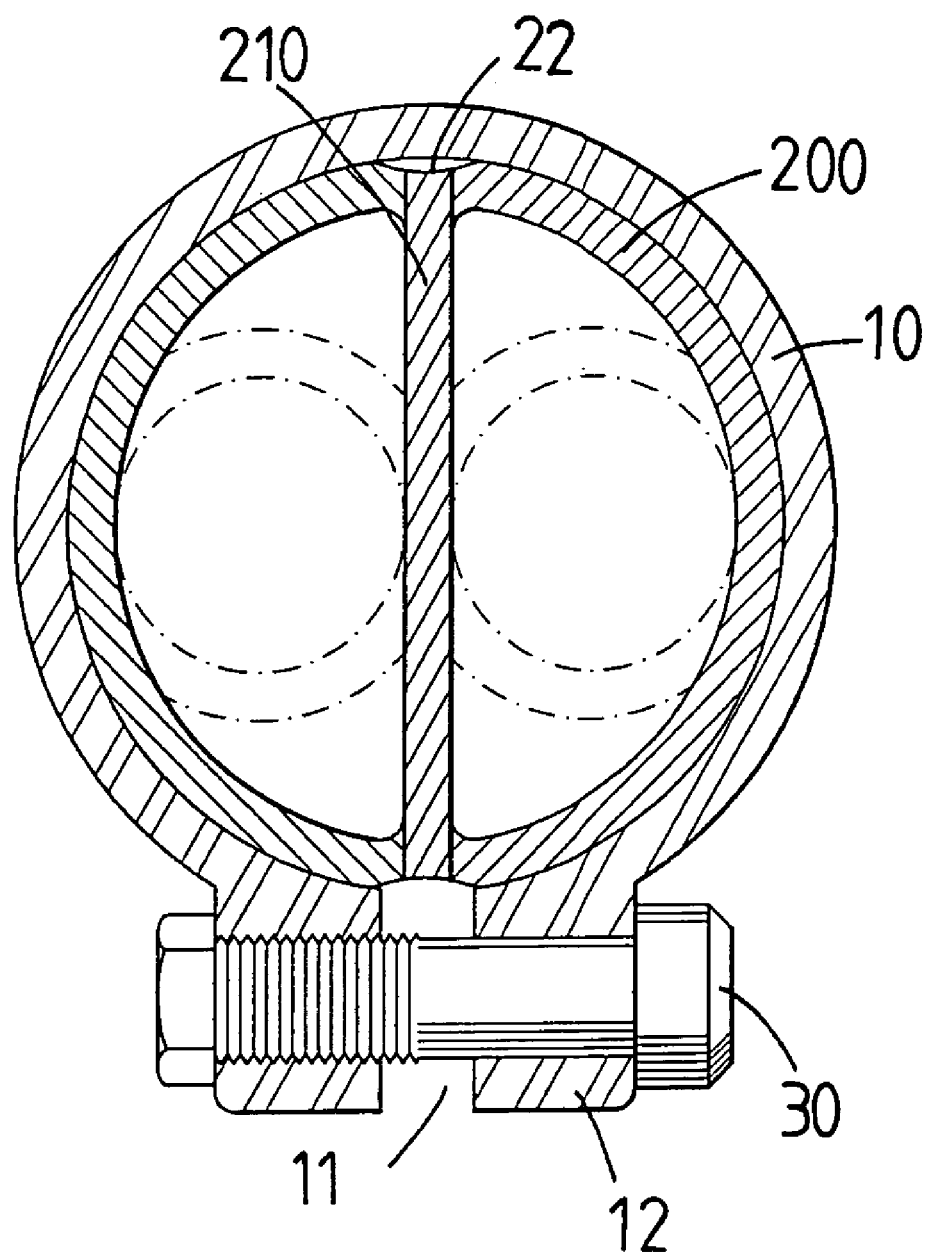
FIG. 4 shows the two spaces of the seat post each include a small-inner-diameter space.

Referring to FIGS. 1, 3 and 4, the bicycle seat post 20 of the present invention comprises two arcuate plates 200 and a reinforcement board 210 sandwiched between the two arcuate plates 200. Each arcuate plate 200 has two lengthwise end surfaces 201 and each end surface 201 includes an inner corner edge 202 and an elongate surface 203 is defined in an outer corner edge thereof. The reinforcement board 210 is sandwiched between the two arcuate plates 200 wherein the two lengthwise end surfaces 201 contact two opposite sides of the reinforcement board 210. Each of lengthwise top surface 211 and lengthwise bottom surface 212 of the reinforcement board 210 is connected between the two respective elongate surfaces 203 of the two arcuate plates 200 so as to form two longitudinal grooves 22 in an outer surface of the seat post 20.

The seat post 20 is inserted in a seat tube 10 of a bicycle frame and a split 11 is defined in the open end of the seat tube 10 and two lugs 12 extend from two facing ends of the split 11. A bolt 30 extends through the two lugs 12 and is connected to a nut so as to clamp the seat tube 20 to position the seat post 10. The other end of the seat post 20 is connected with a seat.

The stress concentration is usually happened at the two points "A" at the two respective edges of the split 11. Thanks for the grooves 22, points "A" are yield by the grooves 22 so that the seat post 20 can be prevented from cracks by the inward force by the clamping force from the bolt 30.

Referring to FIG. 4, each of the two spaces divided by the reinforcement rib 21 in the seat post 20 forms a small-inner-diameter space. A cylindrical tube with a smaller inner diameter can bear a larger inward force than a cylindrical tube with a larger inner diameter, so that the seat post 20 of the present invention is able to bear a larger force then the conventional seat post.

While we have shown and described the embodiment in accordance with the present invention, it should be clear to those skilled in the art that further embodiments may be made without departing from the scope of the present invention.

What is claimed is:

1. A bicycle seat post comprising:
   two arcuate plates and each arcuate plate having two lengthwise end surfaces, each end surface having an inner corner edge and an elongate surface defined in an outer corner edge thereof, and
   a reinforcement board sandwiched between the two arcuate plates and the two lengthwise end surfaces contacting two opposite sides of the reinforcement board, each of lengthwise top surface and lengthwise bottom surface of the reinforcement board connected between the two respective elongate surfaces of the two arcuate plates so as to form two longitudinal grooves in an outer surface of the seat post.

* * * * *